United States Patent [19]

Schnell et al.

[11] Patent Number: 5,060,538
[45] Date of Patent: Oct. 29, 1991

[54] GEAR SHIFT MECHANISM FOR A MANUAL AUTOMOTIVE TRANSMISSION

[75] Inventors: Martin Schnell, Pulheim; Wolfgang Winter-Peter; Gustav Sabel, both of Cologne, all of Fed. Rep. of Germany

[73] Assignee: Ford Motor Company, Dearborn, Mich.

[21] Appl. No.: 510,491

[22] Filed: Apr. 18, 1990

[30] Foreign Application Priority Data

Apr. 22, 1989 [DE] Fed. Rep. of Germany ....... 3913269

[51] Int. Cl.⁵ .............................................. G05G 9/12
[52] U.S. Cl. .................................................. 74/477
[58] Field of Search .......................... 74/473, 475, 477

[56] References Cited

U.S. PATENT DOCUMENTS

| | | | |
|---|---|---|---|
| 4,377,951 | 3/1983 | Magg et al. | 74/477 |
| 4,539,859 | 9/1985 | Arai et al. | 74/475 |
| 4,572,020 | 2/1986 | Katayama | 74/477 |
| 4,605,109 | 8/1986 | Fukuchi et al. | 74/475 X |
| 4,608,877 | 9/1986 | Okubo et al. | 74/477 X |

FOREIGN PATENT DOCUMENTS 2417042 10/1976 Fed. Rep. of Germany.
3000577  1/1983 Fed. Rep. of Germany.
3424793 10/1986 Fed. Rep. of Germany.

Primary Examiner—Richard E. Moore
Attorney, Agent, or Firm—Frank G. McKenzie; Keith L. Zerschling

[57] ABSTRACT

A gear shift mechanism for a manual transmission includes a shaft axially movable for selecting shift planes and rotatable for engaging the gears defining the shift planes. The shaft is held in a reference shift plane by two helical springs. A finger, fixed to the shaft, carries a cam defining detent surfaces engaged by a spring-loaded catch stud. Shift fork rods support shift forks which have arms formed with grooves extending toward a locking plate that is moved axially along the shaft by the shift finger. The locking plate blocks engagement grooves of the unselected shift forks.

8 Claims, 5 Drawing Sheets

5,060,538

GEAR SHIFT MECHANISM FOR A MANUAL AUTOMOTIVE TRANSMISSION

BACKGROUND OF THE INVENTION

1. Field of the Invention

This invention relates to the field of shift mechanism for manually operated automotive transmissions. More particularly, the invention pertains to a shift mechanism having an interlock to prevent movement of unselected shift forks, a centering assembly to urge the shift shaft to a predetermined neutral position and detents to hold the mechanism in selected positions.

2. Prior Art

U.S. Pat. No. 4,539,859 describes a manual transmission gear shift mechanism in which a selector shaft is forced by a helical compression spring to the gear shift plane in which a shift lever moves whenever the vehicle operator removes manual control over the shift lever. The selector shaft supports a shift finger, which includes detent recesses engaged by a spring-loaded stud, which recesses define positions among which the selector shaft moves. Shift fork rods support shift forks, which include arms having grooves extending into a region in which the shift finger moves. The shift fork arms cooperate with an axially movable locking plate also supported on the selector shaft. When the vehicle operator moves the gear selector lever, the shift finger selects an engagement groove on one of the shift forks. Adjacent the shift finger, the locking plate define locking tongues, which block movement of the shift fork arms that are unselected by engagement with the shift finger. The locking tongues prevent subsequent radial movement of the unselected shift forks as the shift finger moves in response to movement of the selector lever by the vehicle operator.

Production tolerances inherent in this arrangement have a marked effect on the quality of shifting due to the nature of the support of the helical compression springs. This shift mechanism cannot be assembled in the transmission casing in one step; instead, it requires several consecutive assembly steps because the interlocking device is located within the transmission casing.

The shift mechanism of this patent is designed for transverse installation, i.e., for assembly in the motor vehicle whose front wheels are driven by an engine whose crankshaft is directed laterally rather than parallel to the longitudinal axis of the vehicle. The transmission shafts and the shift fork rods that support the shift forks extend transversely with respect to the longitudinal axis of the vehicle and the selector shaft extends substantially horizontally and parallel to the longitudinal axis of the vehicle. The selector shaft is connected to the gear shift lever in the conventional manner using an outer gear shift shaft having conventional joints.

German Patent 24 17 042 describes a transmission connected to an engine arranged transversely in the motor vehicle. The transmission shafts are also arranged transversely with respect to the longitudinal axis of the vehicle. A shift fork rod, also arranged transversely, holds corresponding shift forks, actuated by a vertically directed internal gear shift shaft mounted at its top and bottom in the transmission casing. This shaft is connected by conventional external turning joints to an outer shaft extending substantially horizontal and parallel to the longitudinal axis of the vehicle.

The gear shift mechanism of this patent has the disadvantage that the vertically mounted internal selector shaft located in the transmission casing extends outward beyond the transmission casing at its bottom. The casing must be sealed in that location against the passage of transmission fluid. The stuffing box arrangement present in the device of this patent is extremely complex and expensive. Movement of the selector shaft occurs outside the transmission casing where joints have to be provided in a complex, expensive matter with seals due to the risk of contamination. The difficulties with sealing these several apertures have been solved with the mechanism of the present invention.

SUMMARY OF THE INVENTION

An object of the present invention is to improve the gear shift mechanism for use in manually operated automotive transmissions. The shift mechanism of the present invention can be preassembled completely with all necessary individual parts on an internal shift shaft located within the transmission casing. A gear shift cover is assembled with various components of the shift mechanism in a single step that can be performed by automatic handling devices. No sealing problems occur at the lower shaft bearing, and gear shaft movement can be accommodated economically within the transmission casing.

In order to achieve these objectives, the shift mechanism includes a selector shaft, axially movable to select among several shift planes, and rotatable to engage the gear ratios located within the shift planes. The shaft is supported on a bearing located in a transmission casing and on a bearing located on a cover near the outer periphery of the transmission casing. Two helical compression springs urge the selector shaft to a predetermined shift plane whenever the vehicle operator relaxes control over a gear selection lever connected to the selector shaft. A shift finger affixed to the selector shift includes a cam, which defines detent recesses engaged by a spring-loaded stud to hold the selector shaft in various positions corresponding to the shift planes.

Gear shift fork rods slidably support shift forks, which include arms having grooves extending within the region into which the selector finger moves. A locking plate, supported on the selector shaft and moved axially by the selector finger, is held against rotation by a cylindrical sleeve fitted within a slot that extends parallel to the axis of the selector shaft. The locking plate prevents rotation of the selector shaft relative to an axis in which the slot is formed. When one groove on a shift fork arm is engaged by moving the shift finger, surfaces formed on the locking plate adjacent the shift finger engage the engaging grooves of the other, unselected shift fork arms. This action holds the unselected shift forks during subsequent rotation of the selector finger.

An internal shift selector shaft is mounted at the bottom of a projection protruding inside the transmission casing. Displacement of the selector shaft occurs above that point. A cylindrical chamber holds two concentric helical springs above the selector shaft. The inner spring rests on a lower spring plate and urges the selector shaft upward so that a shoulder on the selector shaft contacts the lower spring plate. An outer spring, located between the cover and the lower spring plate, presses the plate into contact with a bearing bushing. This arrangement seals the bottom of the cylindrical chamber and the assembly is inserted into a sheet metal plate connected to the shift cover. A sheet metal angle, which extends perpendicular to the axis of the gear shift finger and the detent cam, is welded to the sheet metal plate and defines a system of interconnected slots that limits the range of motion of the selector pin to the shift planes and gear shift positions within the shift planes. A spring loaded catch stud is forced into engagement with the detent surfaces on the cam.

All of the individual parts of the shift mechanism whose positions are tolerance-sensitive are arranged only in the upper region of the selector shaft. These parts can be preassembled on the shaft or on the shift cover. The preassembled gear shift mechanism can be installed from above in one step.

Influences of production tolerances on the quality of shifting are minimized by relating all axial tolerances of the shift mechanism to the fixing plate of the gear shift cover. The metal shift plate is centered in the gear shift cover in a concentric, angularly correct manner by fitting the shift metal plate within an aperture formed in the transmission casing, the periphery of the aperture conforming to the circular periphery of the sheet metal plate.

BRIEF DESCRIPTION OF THE DRAWINGS

The invention is described in more detail with reference to the embodiment illustrated in the accompanying drawings.

DESCRIPTION OF THE PREFERRED EMBODIMENT

Figure 1:
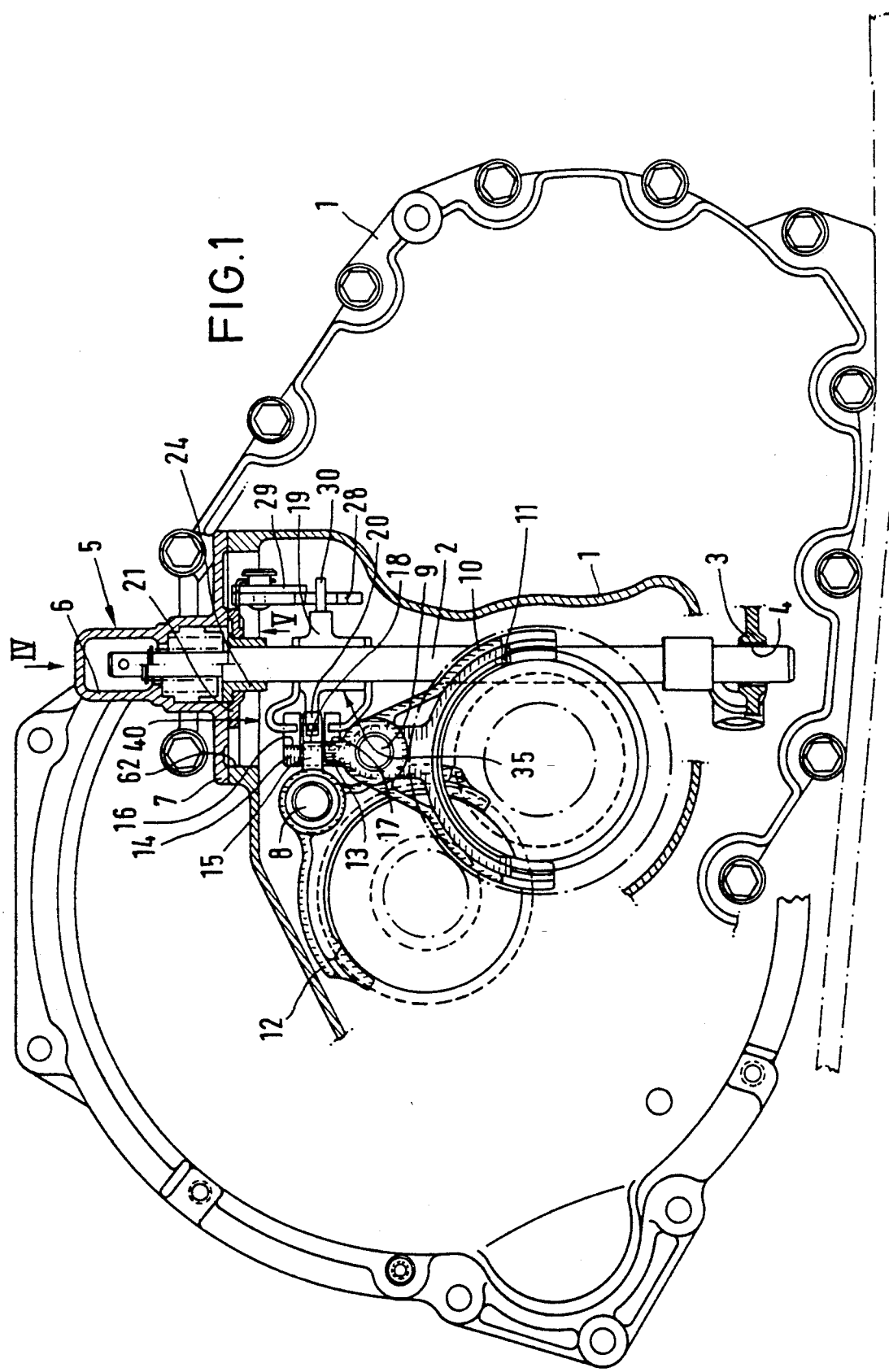
FIG. 1 is a vertical cross section through a manual transmission, parallel to the longitudinal center plane of a motor vehicle, taken in the plane of the gear shift shaft.
Figure 2:
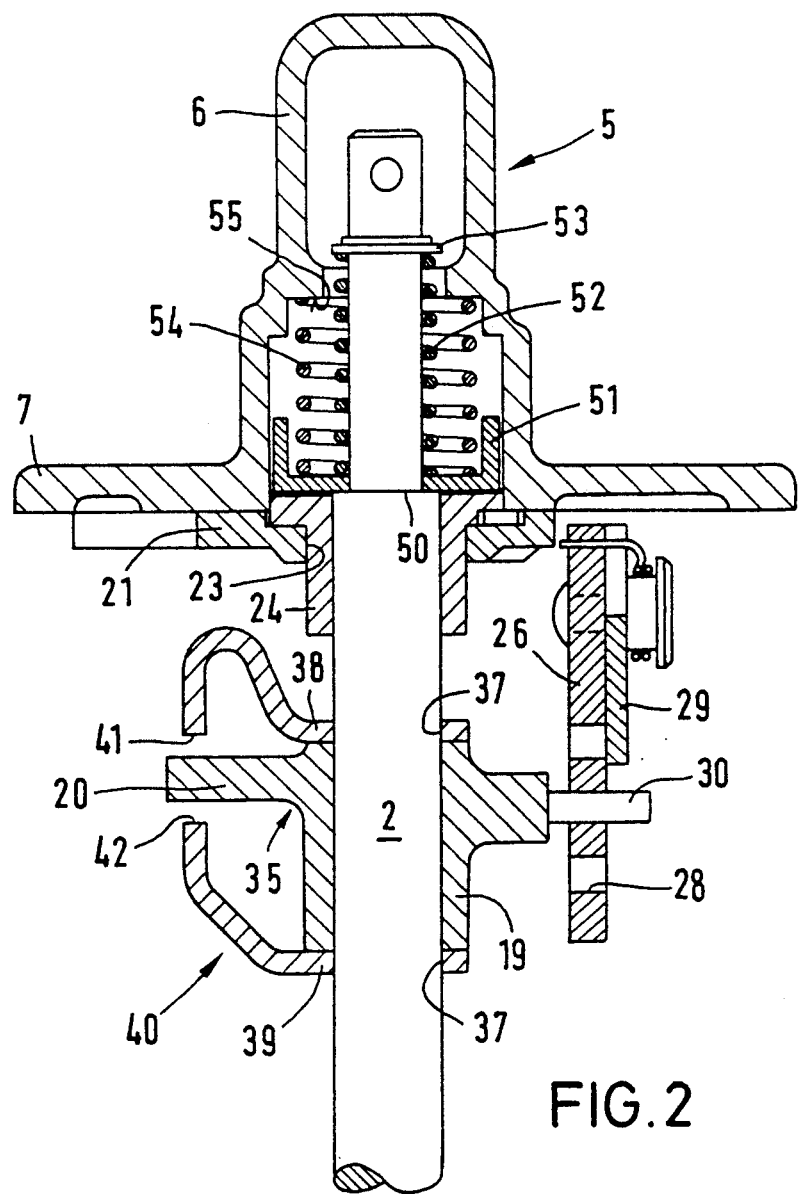
FIG. 2 is a cross section of that portion of the gear shift mechanism located near the end of the gear shift shaft and including the gear shift cover. The cross section is taken at substantially the same plane as that of FIG. 1.
Figure 3:
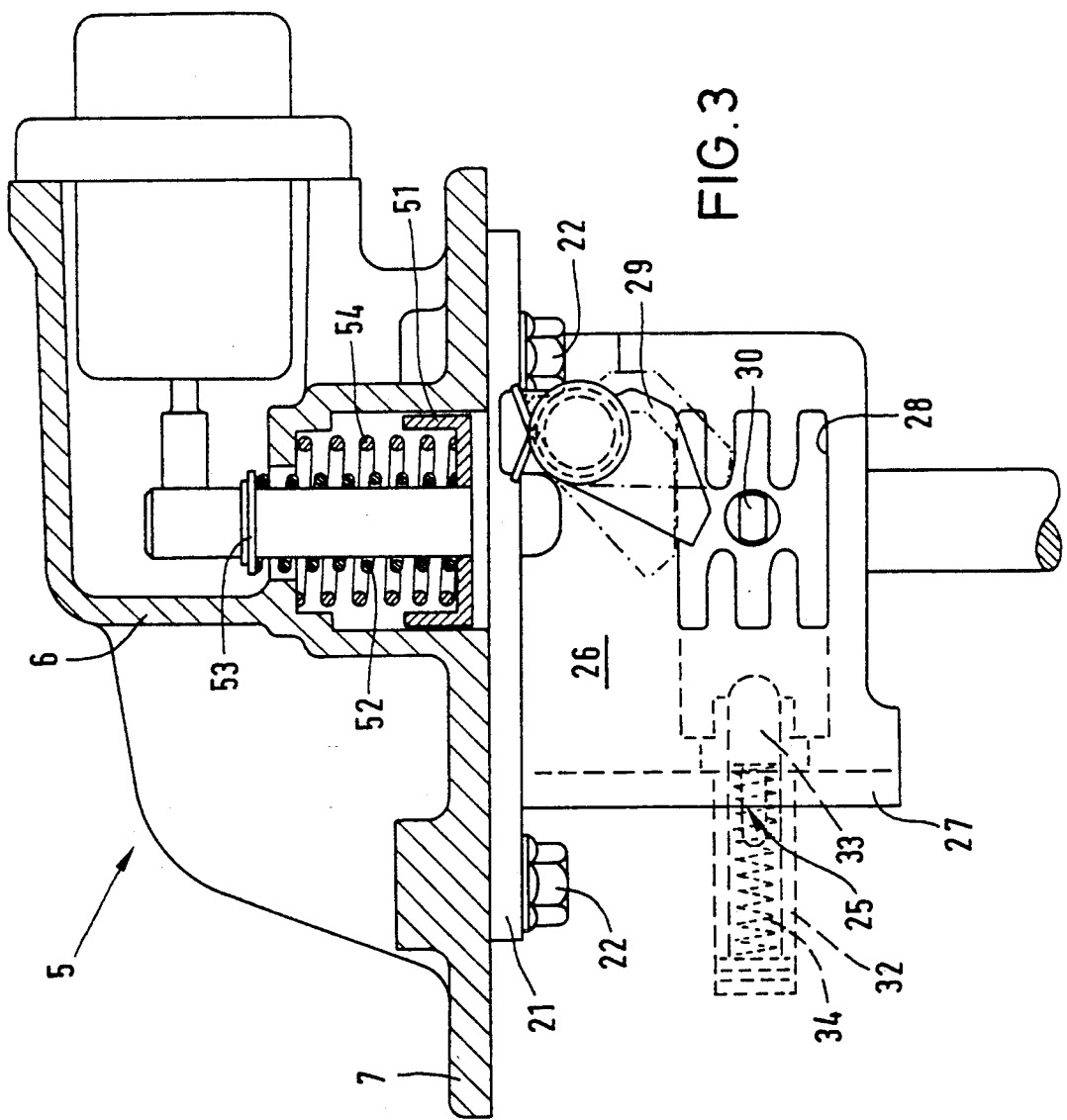
FIG. 3 is a cross section of a portion of the gear shift mechanism of FIG. 1 viewed from the right-hand side of the guide plate.

Referring first to FIGS. 1, 2, and 3, a transmission casing 1 is represented by a flange extending around its periphery, whereby it is joined by bolts to another, mating transmission casing. That portion of the shift mechanism located in the plane of the vertical internal gear shift shaft 2 is shown in cross section. Shaft 2 is mounted at its lower end in a passage 4 formed in a supporting web or projection 3 integral with the casing. Shaft 2 is also supported and located by a bushing 24 near cover 5. The cover includes a cylindrical casing 6 and a flange 7.

Several shafts of the transmission and gears carried on those shafts that carry torque are shown in FIG. 1 in phantom lines. Shift fork rods 8 and 9, which extend parallel to the shafts and perpendicular to shaft 2, support shift forks 10, 11 and 12. Each of the shift forks is formed with a gear shift arm 13, 14 and 15, each arm having an engagement groove 16, 17, and 18, which extends within the region of movement of a shift finger 20, fixed by its hub 19 on shaft 2.

A sheet metal plate 21, in which bearing bushing 24 is pressed through an opening 23, is rigidly connected by bolts 22 to the underside of flange 7. The outer periphery of bushing 24 centers plate 21 and its opening 23, and the flange of bushing 24 centers cover 5 and its cylindrical recess relative to the internal shift shaft 2. Angle 25 has two legs 26, 27 welded on plate 21 by projection welding. A shift gate 28, comprising a system of interconnected slots, having the form of the gear shift pattern through which the gear selector is moved, is formed on leg 26. A reverse gear ratchet 29 is also supported on arm 26 of the angle 25. The ratchet and shift gate cooperate with a shift pin 30 fitted within the gate and carried on shift finger hub 19 to restrict movement of the pin and shaft 2 to the boundary defined by the slots and to prevent movement from the fifth gear position 5 to the reverse position R. Operation of a device of this type is described in U.S. Pat. No. 4,633,728.

Figure 4:
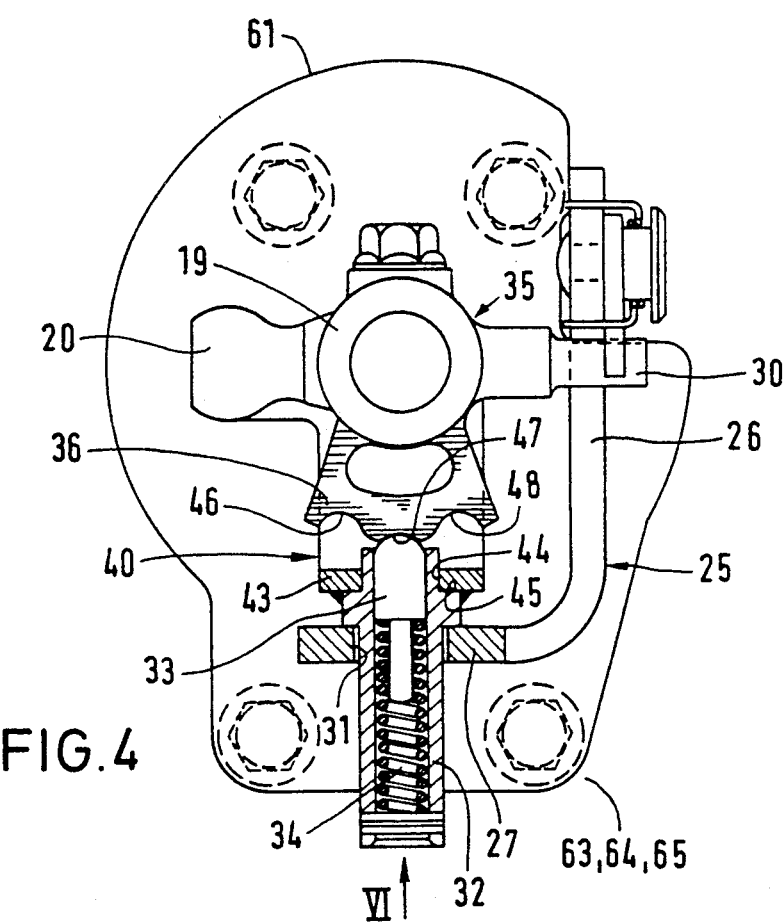
FIG. 4 is a plan view and partial cross section of the gear shift mechanism viewed in the direction of arrow IV of FIG. 1, except that the gear shift cover is removed, and the catch stud/spring arrangement is in cross section.
Figure 6:
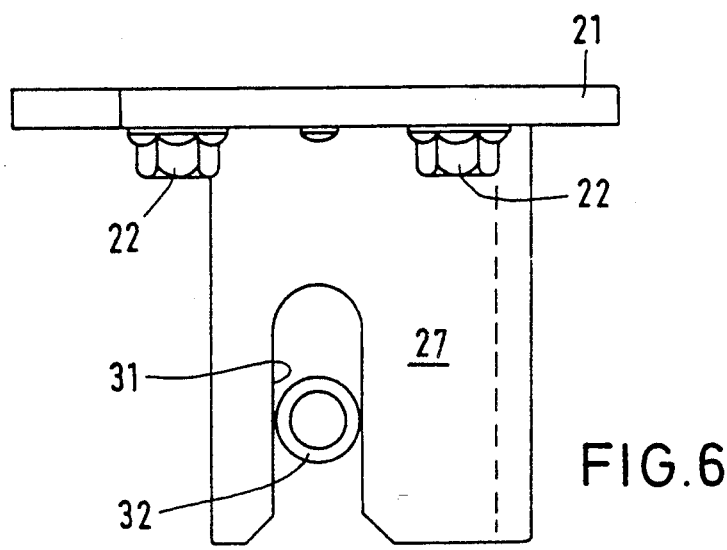
FIG. 6 is a side view of the shift mechanism taken in the direction of arrow VI of FIG. 4.

Referring now to FIGS. 4 and 6, the other arm 27 of angle 25 is formed with a slot 31, which axially guides a holding sleeve 32 of a catch stud spring arrangement 33/34 and is secured against rotation.

A multiple function shift element 35 is fixed axially and nonrotatably on internal shift shaft 2. Element 35 includes shift finger hub 19, shift finger 20, gear shift pin 30 and cam 36.

FIG. 2 shows that shaft 2 carries a locking plate 40 having axial end walls 38, 39 located at opposite axial ends of shift finger hub 19, the end plate having locking tongues 41, 42 adjacent shift finger 20. Locking plate 40 has a web 43, seen best in FIG. 4, connecting its end walls 38, 39. An opening 44 formed in the web receives a projection extending from the radially inner end of holding sleeve 32. A welded connection joins the flange of sleeve 32 to the web of locking plate 40. Located within the sleeve is a compression spring 34 biasing stud 33 radially inward toward cam 36.

Because of the connection among locking plate 40, holding sleeve 32, angle 25 and plate 21, the locking plate 40 cannot rotate with shaft 2. However, plate 40 can move freely in the axial direction with shaft 2 because holding sleeve 32 can move within slot 31 in the leg 27 of the sheet metal angle 25.

Cam 36 has recesses 46, 47 and 48 which define locations spaced angularly about the axis of shaft 2 into which the head of catch stud 33 is urged by the force of compression spring 34. These positions correspond to the 1-2, 3-4 and 5-R shift planes and are detent positions held by engagement of the spring-loaded catch stud in the detent recesses 46–48 on cam 36. Because the entire shift finger arrangement is also moved as the gear shift plane is selected, the width of cam 36 can be kept narrow.

In order to keep movement of the gear shift lever in the desired planes, the upper end of shaft 2, the portion located within casing 6, includes a shoulder 50 contacting a lower spring plate 51. A first or inner helical compression spring 52 rests with its lower end contacting lower spring plate 51 and its upper end urging shaft 2 upward by bearing against a snap ring 53 fixed to the shaft. Spring 52 urges the shaft upward so that its shoulder 50 rests on the lower surface of spring plate 51. A second or outer helical compression spring 54 has its upper end in contact with a surface 55 of a lower web formed integrally with casing 6 and its lower end pressing spring plate 51 downward so that the spring plate contacts bushing 24, which is pressed in sheet metal plate 21.

Contact between lower spring plate 51 and bushing 24 and contact between shoulder 50 and spring plate 51 continually urge the position of shaft 2 into the plane containing the third gear and fourth gear positions of the gear selector lever. When first gear or second gear is selected by the vehicle operator through movement of the selector lever, shaft 2 is pressed upward and thereby loads inner spring 52, whereas the outer spring 54 is not loaded.

When fifth gear or reverse gear is selected, shaft 2 and lower spring plate 51 are raised together, thereby compressing outer spring 54, but the inner spring 52 is not loaded. In this way, by suitably selecting the spring constant of spring 54, a greater load is required to be applied to the selector lever in order to move the selector lever into the plane containing fifth gear and reverse gear.

Figure 7:
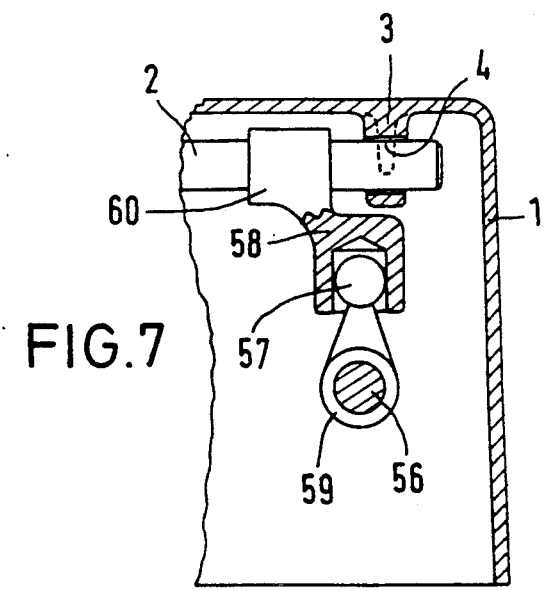
FIGS. 7 and 8 show the portion of the shift mechanism that transmits shifting movement from the manually operated gear-shift lever to the gear-shift shaft.
Figure 8:
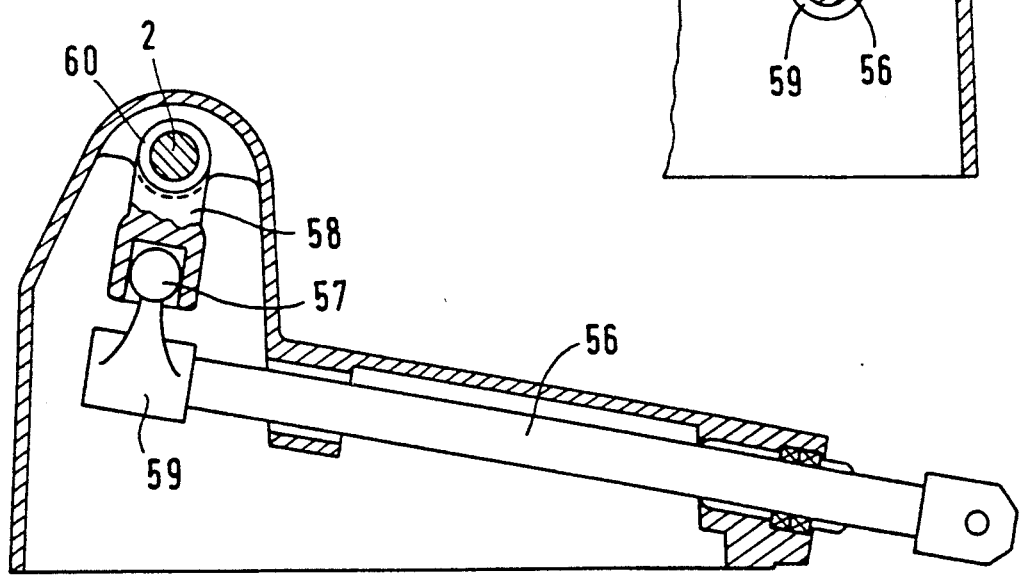

Referring to FIGS. 7 and 8, gear selecting movement of the selector lever controlled by the vehicle operator, is transmitted by a horizontal input gear-shift shaft 56 and a ball and socket joint 57, 58 from a shaft located outside the transmission, connected to the selector lever, and connected to shaft 56. The ball and socket joint 57, 58 is connected by hub 60 to shaft 2 on which the hub is fixed.

Figure 5:
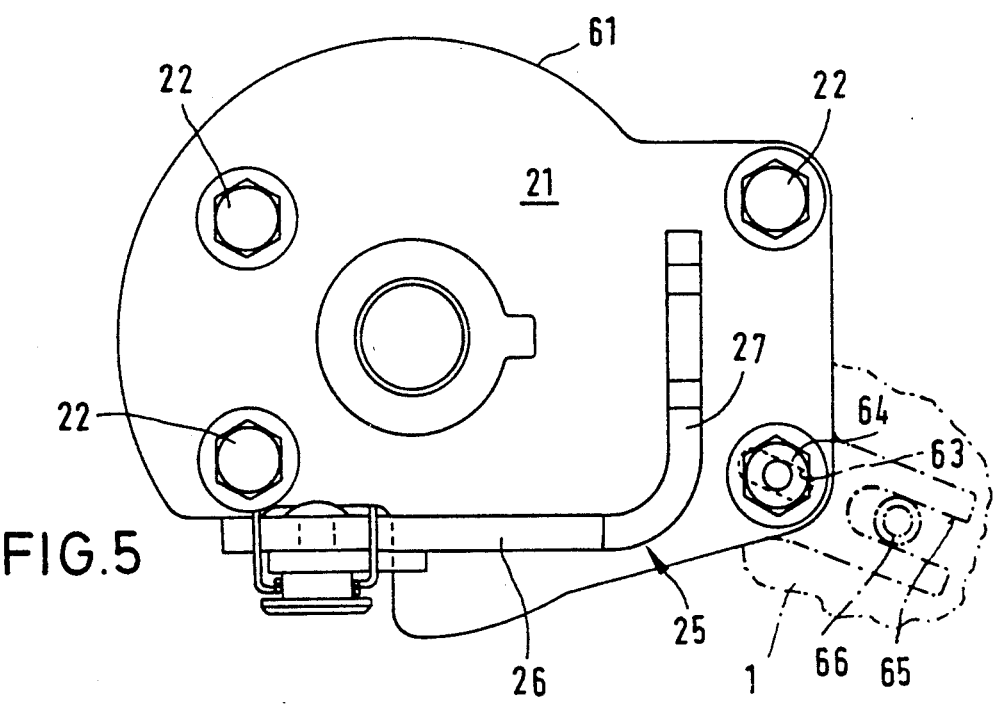
FIG. 5 is a view from below the gear shift mechanism in the direction of arrow V of FIG. 1, with the gear shift finger and locking plate removed.

Referring to FIG. 5, sheet metal plate 21, which is fixed by bolts 22 to flange 7 of cover 5, has a circular outer periphery 61 extending over nearly 180°. This periphery is fitted and centered in a circular aperture 62 formed in the transmission casing 1. Before installation torque is applied to bolts 22, the angular position of plate 21 relative to casing 1 is established by inserting one of the attachment bolts 64 into an elongated locating opening or slot 63, formed in plate 21 and directed radially. The width of slot 63 closely matches the diameter of a surface ground on the shank of bolt 64 and is located so that the ground diameter fits within the slot. Thereafter, bolts 22 are torqued to the installation torque. To achieve more accurate centering, sheet metal plate 21 can be centered relative to the cover 5 using the locating slot and fixing bolt arrangement 63, 64, and cover 5 is centered separately by fitting a locating bush 66, located in a reamed hole on an interior surface of the transmission casing, within a locating slot 65 formed on a projection of the cover 5. The width of slot 65 closely matches the diameter of locating bush 66.

Having described a preferred embodiment of our invention, what we claim and desire to secure by U.S. Letters Patent is:

1. A gear shift mechanism for an automotive manual transmission controlled manually by movement of a gear selector lever among several gear shift planes, each plane containing selectable gear positions, comprising:
   a gear selector shaft supported for rotation about its axis and displacement along its axis;
   a selector finger extending radially from the selector shaft;
   a shift fork rod slidably supporting shift forks, each shift fork having an arm extending toward the selector finger, each arm formed with a groove adapted for engagement with the selector finger;
   a cam fixed to the selector shaft, having detent recesses spaced angularly about the axis of the selector shaft, each recess corresponding to a gear shift plane;
   a cam fixed against rotation relative to the shaft, biased by a spring toward engagement with the detent recesses of the cam;
   a locking plate held against rotation and supported for movement along the selector shaft, having first and second locking tongues, each tongue located at an axially opposite side of the selector finger and adapted to engage grooves on the shift fork arms, a web connecting the first and second locking tongues having a hole through which a cam holding sleeve passes;
   a spring plate having an aperture through which the selector shaft passes;
   a first plate having an aperture through which the selector shaft passes;
   a bushing located in the aperature having a flange contacting the first plate;
   a cover located at an end of the selector shaft defining a chamber for receiving two concentric helical springs, the first spring biasing the selector shaft against the spring plate, the second spring pressing the spring plate into contact with said bushing, contact between the bushing and the first plate sealing said chamber;
   an angle joined to the first plate, having a first leg substantially perpendicular to the selector finger formed with a system of interconnected slots corresponding to the gear shift planes, and a second leg substantially parallel to the selector finger having a slot directed substantially parallel to the axis of the selector shaft, the holding sleeve extending through said slot and through the web of the locking plate; and
   a pin extending outward from the selector shaft diametrically opposite the selector finger and extending within the interconnected slots of the angle.

2. The gear shift mechanism of claim 1 wherein the first plate has a circular periphery and a slot directed substantially radially with respect to the shaft, the slot having a predetermined width, and the gear shift mechanism is located in a transmission casing having a circular recess in which the first plate is located, further comprising:
   a fixing bolt having a portion located within the slot and of substantially the same width as the width of the slot, having threads adapted to engage the first plate for connecting the first plate to the cover and for establishing the angular position of the first plate relative to the cover.

3. The gear shift mechanism of claim 1 wherein the first plate has a circular periphery and a first slot directed substantially radially with respect to the shaft, the first slot having a predetermined width, and the gear shift mechanism is located in a transmission casing having a circular recess in which the first plate is located, further comprising:
   a fixing bolt having a portion located within the first slot and of substantially the same width as the width of the slot, having threads adapted to engage the first plate for connecting the first plate to the cover and for establishing the angular position of the first plate relative to the cover;

a locating bushing having a predetermined width and location, fixed to an inner surface of the transmission casing;

the cover having a second slot directed substantially radially with respect to the axis of the shaft, the second slot having a predetermined width, the locating bushing located within the second slot for establishing the angular position of the cover relative to the casing.

4. A gear shift mechanism for an automotive manual transmission controlled manually by movement of a gear selector lever among several gear shift planes, each plane containing selectable gear positions, comprising:

a gear selector shaft supported for rotation about its axis and displacement along its axis;

means fixed to the selector shaft defining detent recesses spaced angularly about the axis of the selector shaft, each recess corresponding to a gear shift plane;

means fixed against rotation relative to the shaft, biased by a spring toward releasable engagement with the detent recesses;

a spring plate having an aperture through which the selector shaft passes;

a first plate having an aperture through which the selector shaft passes;

a bushing located in the aperature having a flange contacting the first plate; and a cover located at an end of the selector shaft defining a chamber for receiving two concentric helical springs, the first spring biasing the selector shaft against the spring plate, the second spring pressing the spring plate into contact with said bushing, contact between the bushing and the first plate sealing said chamber.

5. The shift mechanism of claim 4 further comprising:

a selector finger extending radially from the selector shaft;

a shift fork rod slidably supporting shift forks, each shift fork having an arm extending toward the selector finger, each arm formed with a groove adapted for engagement with the selector finger; and a locking plate held against rotation and supported for movement along the selector shaft, having first and second locking tongues, each tongue located at an axially opposite side of the selector finger and adapted to engage grooves on the shift fork arms, a web connecting the first and second locking tongues having a hole through which the holding sleeve passes.

6. The shift mechanism of claim 4 further comprising:

an angle joined to the first plate, having a first leg substantially perpendicular to the selector finger formed with a system of interconnected slots corresponding to the gear shift planes, and a second leg substantially parallel to the selector finger having a slot directed substantially parallel to the axis of the selector shaft, the holding sleeve extending through said slot and through the web of the locking plate; and a pin extending outward from the selector shaft diametrically opposite the selector finger and extending within the interconnected slots of the angle.

7. The gear shift mechanism of claim 4 wherein the first Plate has a circular periphery and a slot directed substantially radially with respect to the shaft, the slot having a predetermined width, and the gear shift mechanism is located in a transmission casing having a circular recess in which the first plate is located, further comprising:

a fixing bolt having a portion located within the slot and of substantially the same width as the width of the slot, having threads adapted to engage the first plate for connecting the first plate to the cover and for establishing the angular position of the first plate relative to the cover.

8. The gear shift mechanism of claim 4 wherein the first plate has a circular periphery and a first slot directed substantially radially with respect to the shaft, the first slot having a predetermined width, and the gear shift mechanism is located in a transmission casing having a circular recess in which the first plate is located, further comprising:

a fixing bolt having a portion located within the first slot and of substantially the same width as the width of the slot, having threads adapted to engage the first plate for connecting the first plate to the cover and for establishing the angular position of the first plate relative to the cover;

a locating bushing having a predetermined width and location, fixed to an inner surface of the transmission casing;

the cover having a second slot directed substantially radially with respect to the axis of the shaft, the second slot having a predetermined width, the locating bushing located within the second slot for establishing the angular position of the cover relative to the casing.

* * * * *